United States Patent
Edler et al.

(10) Patent No.: US 11,254,207 B2
(45) Date of Patent: Feb. 22, 2022

(54) METHOD FOR COMPENSATING CLUTCH TORQUE IN AN ELECTRONIC LIMITED SLIP DIFFERENTIAL

(71) Applicant: Eaton Intelligent Power Limited, Dublin (IE)

(72) Inventors: Andrew N. Edler, Homer, MI (US); John A. Grogg, Laotto, IN (US)

(73) Assignee: Eaton Intelligent Power Limited, Dublin (IE)

( * ) Notice: Subject to any disclaimer, the term of this patent is extended or adjusted under 35 U.S.C. 154(b) by 6 days.

(21) Appl. No.: 16/600,809

(22) Filed: Oct. 14, 2019

(65) Prior Publication Data

US 2020/0040985 A1 Feb. 6, 2020

Related U.S. Application Data

(63) Continuation of application No. PCT/US2018/027686, filed on Apr. 14, 2018.

(60) Provisional application No. 62/485,498, filed on Apr. 14, 2017.

(51) Int. Cl.
  *B60K 23/04* (2006.01)

(52) U.S. Cl.
  CPC ........ *B60K 23/04* (2013.01); *B60K 2023/043* (2013.01)

(58) Field of Classification Search
  None
  See application file for complete search history.

(56) References Cited

U.S. PATENT DOCUMENTS

| | | | |
|---|---|---|---|
| 4,245,525 A | 1/1981 | LeBegue | |
| 5,168,953 A * | 12/1992 | Naito | B60K 17/20 |
| | | | 180/197 |
| 5,456,641 A | 10/1995 | Sawase | |
| 7,801,657 B2 * | 9/2010 | Piyabongkarn | F16H 48/30 |
| | | | 701/82 |
| 2007/0114089 A1 | 5/2007 | Yoneda et al. | |
| 2016/0229290 A1 | 8/2016 | Chimner | |
| 2017/0089439 A1 * | 3/2017 | Monticello | F16H 48/22 |

FOREIGN PATENT DOCUMENTS

WO    2007088467 A2    8/2007

OTHER PUBLICATIONS

International Search Report and Written Opinion for International Application No. PCT/US2018/027686 dated Jul. 27, 2018.

\* cited by examiner

*Primary Examiner* — Timothy Hannon
(74) *Attorney, Agent, or Firm* — RMCK Law Group PLC

(57) ABSTRACT

A method of determining clutch torque for a limited slip differential gear mechanism on a vehicle includes obtaining an estimated driveline torque. A desired bias torque is established. A necessary clutch torque required to achieve the desired bias torque is determined. The necessary clutch torque is commanded based on the estimated driveline torque to achieve the desired bias torque.

5 Claims, 1 Drawing Sheet

METHOD FOR COMPENSATING CLUTCH TORQUE IN AN ELECTRONIC LIMITED SLIP DIFFERENTIAL

CROSS REFERENCE TO RELATED APPLICATIONS

This application is a continuation of International Application No. PCT/US2018/027686 filed Apr. 14, 2018 which claims priority to U.S. Provisional Application No. 62/485,498 filed on Apr. 14, 2017. The disclosure of the above application is incorporated herein by reference.

FIELD

The present disclosure relates generally to differential gear mechanisms and more particularly to a method that provides limited slip differential (LSD) clutch torque compensation for differential gear torque bias as a function of driveline torque.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions. In some examples it is challenging to configure the differential case to accommodate the required components while optimizing packaging space on the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of determining clutch torque for a limited slip differential gear mechanism on a vehicle includes obtaining an estimated driveline torque. A desired bias torque is established. A necessary clutch torque required to achieve the desired bias torque is determined. The necessary clutch torque is commanded based on the estimated driveline torque to achieve the desired bias torque.

According to additional features, control determines whether the vehicle is turning one of left and right. The clutch torque is based on the determination of the vehicle turning one of left and right. Clutch torque is calculated using a first set of equations based on the vehicle turning left. Clutch torque is calculated using a second set of equations, distinct from the first set of equations, based on the vehicle turning right.

According to other features, a left output shaft torque is determined. A right output shaft torque is determined. The bias torque is calculated based on the left and right output shaft torques. The limited slip differential gear mechanism includes a bevel gear set comprising pinion gears and side gears. The bevel gear set generates a differential gear bias torque. The clutch torque needed to achieve the desired bias torque is based on the differential gear bias torque. The commanded clutch torque is reduced as the driveline torque is increased.

A method of determining clutch torque for a limited slip differential gear mechanism on a vehicle according to additional features of the present disclosure includes obtaining an estimated driveline torque. A desired bias torque is established. A differential gear bias torque provided by a bevel gear set in the limited slip differential gear mechanism is determined. A necessary clutch torque required to achieve the desired bias torque is determined. The necessary clutch torque is commanded based on the estimated driveline torque to achieve the desired bias torque.

According to additional features, control determines whether the vehicle is turning one of left and right. The clutch torque is based on the determination of the vehicle turning one of left and right. Clutch torque is calculated using a first set of equations based on the vehicle turning left. Clutch torque is calculated using a second set of equations, distinct from the first set of equations, based on the vehicle turning right.

According to other features, a left output shaft torque is determined. A right output shaft torque is determined. The bias torque is calculated based on the left and right output shaft torques. The commanded clutch torque is reduced as the driveline torque is increased.

A method of determining output shaft torque for a limited slip differential gear mechanism according to additional features includes determining a driveline torque. A clutch torque is determined. An output shaft torque is determined based on the driveline torque and the clutch torque. Determining the clutch torque comprises determining a limited slip differential clutch torque. Determining the limited slip differential clutch torque comprise determining an electronic limited slip differential clutch torque. Determining the output shaft torque includes determining a left output shaft torque and a right output shaft torque. A combined effect of friction between a first and second side gear of the limited slip differential gear mechanism and a case of the limited slip differential gear mechanism is determined. A mean effective radius of the combined effect of friction is determined. Determining the combined effect of friction includes establishing a constant used as a coefficient of cross shaft torque of a cross shaft of the limited slip differential gear mechanism.

BRIEF DESCRIPTION OF THE DRAWINGS

The present disclosure will become more fully understood from the detailed description and the accompanying drawings, wherein.

DETAILED DESCRIPTION

Figure 1:
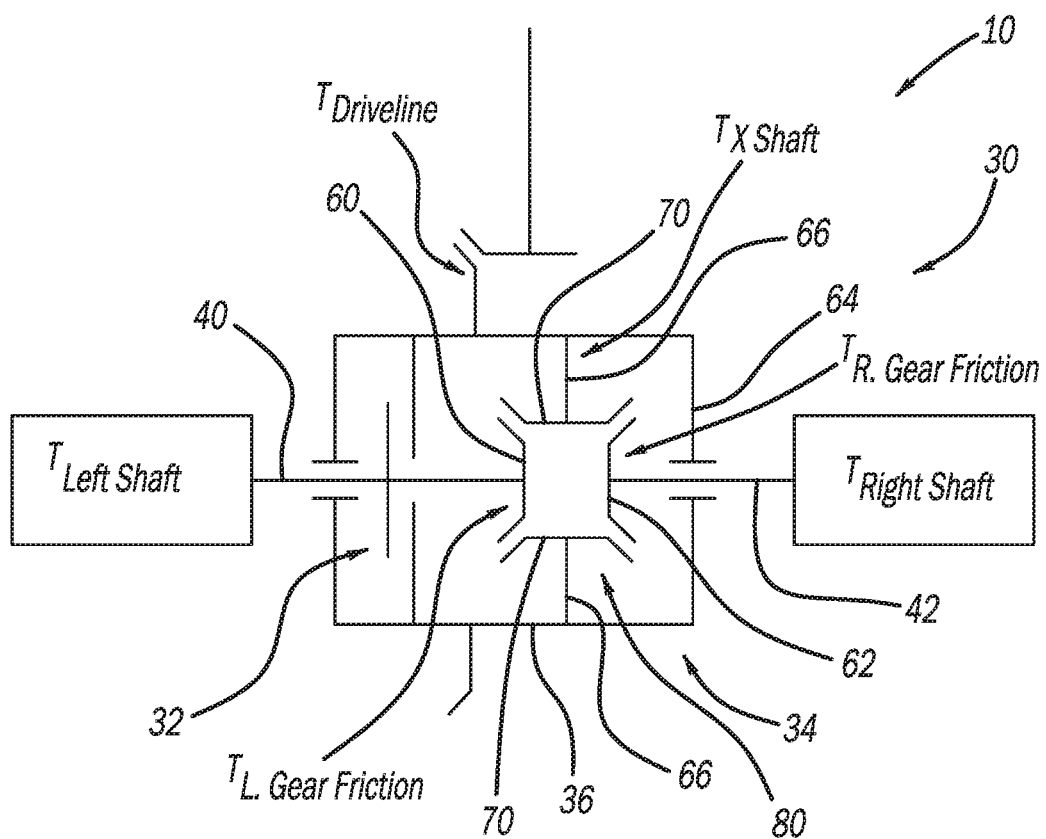
FIG. 1 is schematic diagram of an exemplary LSD constructed in accordance to one example of the present disclosure.

With initial reference to FIG. 1, an exemplary vehicle driveline is shown and generally identified with reference numeral 10. The exemplary vehicle driveline 10 includes a limited slip differential (LSD) assembly 30 having a clutch assembly 32 and a differential gear assembly 34. It will be appreciated that the following disclosure is applicable to mechanical LSD as well as electronic (eLSD) configurations. The limited slip differential assembly 30 is received in a housing 36 and operates to drive a pair of axle shafts 40 and 42 that are connected to drive wheels. In general, the limited slip differential assembly 30 functions as a traditional open differential during normal operating conditions until an event occurs where a bias torque is required. When a loss in traction is detected or anticipated, the clutch assembly 32 can be selectively actuated in order to generate the optimum bias ratio for the situation.

The differential gear assembly 34 includes a pair of side gears 60 and 62 that are mounted for rotation with the axle shafts 40 and 42 (and first and second drive wheels), respectively. The side gears 60 and 62 define first and second axle shaft openings. A plurality of cross pins or pinion gear shafts 66 are fixedly mounted to a differential case 64 for rotation therewith. A corresponding plurality of pinion gears 70 are mounted for rotation with the pinion gear shafts 66 and are in meshing relationship with both of the side gears 60 and 62. The pinion gears 70 and side gears 60, 62 collectively define a bevel gear set 80. The bevel gear set 80 generates bias torque in the differential gear assembly 34. As will become appreciated below, the teachings of the present disclosure take into account the additional bias torque (differential gear bias torque) that the bevel gear set 80 generates when determining a clutch torque needed to achieve a desired bias torque between the left and right axle shafts 40, 42.

In an open configuration, described more fully below, the differential gear assembly 34 acts to allow the axle shafts 40 and 42 to rotate at different speeds.

The clutch assembly 32 can include any configuration such as a clutch pack and a clutch actuator. The clutch pack can includes a plurality of annular plates interleaved between a plurality of annular friction disks. The plurality of annular plates can be coupled for rotation with one of the differential case 64 and the differential gear assembly 34. The plurality of annular friction disks can be coupled for rotation with the other one of the differential case 64 and the differential gear assembly 34. In one example, the plurality of annular plates are coupled for rotation to the differential case 64 (e.g., splined to an inner diameter of the differential case 64) and the plurality of annular friction disks are coupled for rotation with the differential gear assembly 34 (e.g., splined to an outer diameter of the side gear 60). It will be appreciated that the annular friction disks may be supported for rotation by either of the side gears 60 or 62, or both.

The plurality of annular plates and annular friction disks are interleaved between one another and act to rotate past one another in substantially non-contacting relationship when the clutch assembly 32 is in its open position. However, it will be appreciated by those skilled in the art that the term "non-contacting" as used herein is relative and is not meant to necessarily indicate that the annular plates and annular friction disks have absolutely no contact when the clutch assembly 32 is in the open condition. The annular plates and annular friction disks are axially movable into frictional engagement relative to one another, thereby reducing relative rotation between the annular plates and annular friction disks when the clutch assembly 32 is in the closed or partially closed configurations. In this manner, when the clutch assembly 32 is in its closed position, the side gears 60 and 62, as well as the axle shafts 40 and 42 and the drive wheels rotate together.

The clutch assembly 32 can operate in an open configuration to allow the side gears 60 and 62 to rotate independently from each other, e.g., at different speeds. The clutch assembly 32 can also operate in a closed or partially closed configuration where the side gears 60 and 62 rotate together or partially together (that is, not independently), e.g., at substantially the same speed. The clutch assembly 32 can, for example, be a hydraulic clutch assembly 32 that utilizes pressurized hydraulic fluid that can act on a piston to selectively actuate the clutch pack between the open, closed and partially closed configurations.

According to the present disclosure, LSD bias torque is calculated using static sum of moment equations. A total of six equations are required. For a left hand turn, a sum of moments is required for the differential case which allows solving for the cross-shaft torque. Cross torque is an input into two subsequent sum of moment equations for the left and right side gears. The method of using three equations is repeated for a right hand turn.

According to the present method, a user can determine left and right output shaft torque values for a given driveline torque and a given LSD clutch torque. Additionally, a constant is used to represent the combined effect of friction between each side gear and the differential case and the mean effective radius of that friction surface. This constant is used as a coefficient of cross shaft torque divided by two. To represent the torque generated between the side gear and the differential case. A constant value of 0.13 will provide an open differential bias ratio of 1.3. The user can vary this coefficient to match the particular open differential bias ratio being used. The actual open differential bias ratio can be determined experimentally using an instrumented vehicle or in an axle dynometer.

The following discussion is directed to an LSD with the clutch pack splined between the left side gear and the differential case. The sum of moments equations will change if the clutch pack is splined between the right side.

Input data will now be identified.

$T_{Driveline} := 1000$ N·m $T_{Driveline}$ is the estimated rear driveline torque on the CAN bus $C_1 := 0.09$ $C_1$ is a constant representing gear friction due to separating forces. A value of 0.13 provides an open diff (0 clutch torque) bias ratio of 1.3. A value of 0.046 provides a bias ratio of 1.1.

To estimate bias torque output, a commanded clutch torque can be entered.

$T_{Clutch}$:32 400 N·m

To estimate needed clutch torque, a commanded bias torque can be entered.

Bias:=400 N·m

Calculations will now be identified.

Left Turn ($\omega_{Left} < \omega_{Right}$):

The sum of moments on the differential case can be represented by the below equations:

$$T_{L\_Gear} = C_1 \cdot \frac{T_{Xshaft}}{2}$$

$$T_{R\_Gear} = C_1 \cdot \frac{T_{Xshaft}}{2}$$

$T_{L\_Gear}$=Left gear to diff case torque
$T_{Xshaft}$=diff cross shaft torque
$T_{R\_Gear}$=Right gear to diff case torque These equations represent the resultant torque between the side gears and differential case due to side gear separating forces.

$$0 = T_{Driveline} - T_{Clutch} - T_{L_{Gear}} - T_{Xshaft} + T_{R_{Gear}}$$

Therefore, using the above equations:

$$T_{Xshaft} = T_{Driveline} - T_{Clutch}$$

The sum of moments on the left side gear can be represented by the below equations:

$$0 = -T_{L\_Left\_Shaft} + T_{Clutch} + \frac{T_{Xshaft}}{2} + C_1 \cdot \frac{T_{Xshaft}}{2}$$

$T_{L\_Left\_Shaft}$=Left output shaft torque while turning left
Therefore, using the above equations:

$$T_{L\_Left\_Shaft} := T_{Clutch} + \frac{T_{Driveline}}{2} - \frac{T_{Clutch}}{2} + \frac{C_1 \cdot |T_{Driveline}|}{2} - \frac{C_1 \cdot T_{Clutch}}{2}$$

$$T_{L\_Left\_Shaft} = 727 \cdot N \cdot m$$

The sum of moments on the right side gear can be represented by the below equations:

$$0 = -T_{L\_Right\_Shaft} + \frac{T_{Xshaft}}{2} - C_1 \cdot \frac{T_{Xshaft}}{2}$$

$T_{L\_Right\_Shaft}$=Right output shaft torque while turning left
Therefore, using the above equations:

$$T_{L_{Right_{Shaft}}} := T_{Clutch} + \frac{T_{Driveline}}{2} - \frac{T_{Clutch}}{2} + \frac{C_1 \cdot |T_{Driveline}|}{2} + \frac{C_1 \cdot T_{Clutch}}{2}$$

$$Delta_{Left} := |T_{L\_Left\_Shaft} - T_{L\_Right\_Shaft}|$$

$$T_{L\_Right\_Shaft} = 273 \cdot N \cdot m$$

$$Delta_{Left} = 454 \cdot N \cdot m$$

Simplified equation for Delta Torque (Left Turn):

$$|T_{Clutch} - C_1 \cdot T_{Clutch} + C_1 |T_{Driveline}|| = 454 \cdot N \cdot m$$

$$Clutch\_Torque\_Left := -\frac{Bias - C_1 \cdot |T_{Driveline}|}{C_1 - 1}$$

$$Clutch\_Torque\_Left = 341 \cdot N \cdot m$$

$$Bias\_Ratio_{Left} := \left| \frac{T_{L\_Left\_Shaft}}{T_{L\_Right\_Shaft}} \right|$$

$$Bias\_Ratio_{Left} = 2.66$$

Right Turn ($\omega_{Left} > \omega_{Right}$):

$$0 = T_{Driveline} + T_{Clutch} + T_{L_{Gear}} - T_{Xshaft} - T_{R_{Gear}}$$

Therefore, using the above equations:

$$T_{Xshaft} = T_{Driveline} + T_{Clutch}$$

The sum of moments on the left side gear can be represented by the below equations:

$$0 = -T_{R\_Left\_Shaft} - T_{Clutch} + \frac{T_{Xshaft}}{2} - C_1 \cdot \frac{T_{Xshaft}}{2}$$

$T_{R\_Left\_Shaft}$=Left output shaft torque while turning right
Therefore, using the above equations:

$$T_{R\_Left\_Shaft} := -T_{Clutch} + \frac{T_{Driveline}}{2} + \frac{T_{Clutch}}{2} - \frac{C_1 \cdot |T_{Driveline}|}{2} - \frac{C_1 \cdot T_{Clutch}}{2}$$

$$T_{R\_Left\_Shaft} = 237 \cdot N \cdot m$$

Sum of moments on right side gear:

$$0 = -T_{R\_Right\_Shaft} + \frac{T_{Xshaft}}{2} + C_1 \cdot \frac{T_{Xshaft}}{2}$$

$T_{R\_Right\_Shaft}$=Right output shaft torque while turning right
Therefore, using the above equations:

$$T_{R\_Right\_Shaft} := \frac{T_{Driveline}}{2} + \frac{T_{Clutch}}{2} + \frac{C_1 \cdot |T_{Driveline}|}{2} + \frac{C_1 \cdot T_{Clutch}}{2}$$

$$T_{R_{Right_{Shaft}}} = 763 \cdot N \cdot m$$

$$Delta_{Right} := |T_{R\_Left\_Shaft} - T_{R\_Right\_Shaft}|$$

$$Delta_{Right} = 526 \cdot N \cdot m$$

Simplified equation for Delta Torque (Right Turn)

$$|-T_{Clutch} - C_1 \cdot T_{Clutch} - C_1 \cdot |T_{Driveline}|| = 526 \cdot N \cdot m$$

$$Clutch\_Torque\_Right := -\frac{C_1 \cdot |T_{Driveline}| - Bias}{C_1 + 1}$$

$$Clutch\_Torque\_Right = 284 \cdot N \cdot m$$

$T_{R\_Right\_Shaft}$=Right output shaft torque while turning right $$\text{Bias\_Ratio}_{Right} := \left| \frac{T_{R\_Right\_Shaft}}{T_{R\_Left\_Shaft}} \right|$$

$$\text{Bias\_Ratio}_{Right} = 3.22$$

Output Data will now be identified:

If estimating bias torque based on a commanded clutch torque:

Commanded Clutch Torque: $T_{Clutch}$=400·N·m

Left Turn: $T_{L\_Left\_Shaft}$=727·N·m
$T_{L\_Right\_Shaft}$=273·N·m
Delta$_{Left}$=454·N·m
Bias_Ratio$_{Left}$=2.66

Right Turn: $T_{R\_Left\_Shaft}$=237·N·m
$T_{R\_Right\_Shaft}$=763·N·m
Delta$_{Right}$=526·N·m
Bias_Ratio$_{Right}$=3.22

A positive shaft torque will work to accelerate the vehicle in the forward direction. A negative shaft torque will work to accelerate the vehicle in the reverse direction.

Figure 2:
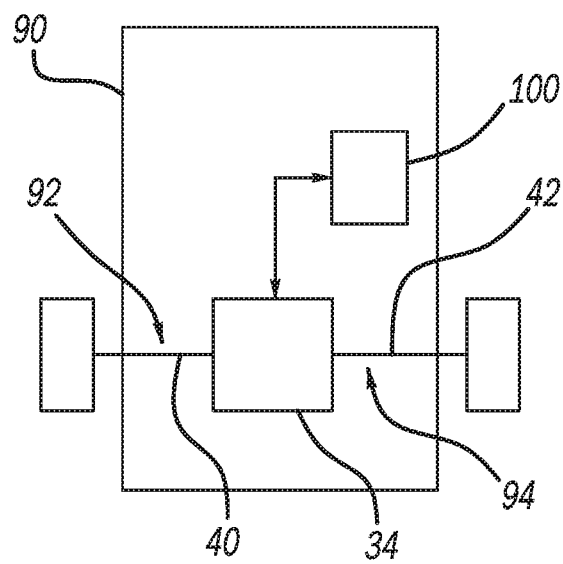
FIG. 2 is a schematic diagram of an exemplary vehicle incorporating the LSD of FIG. 1.

If estimating required clutch torque based on commanded bias torque:

Commanded Bias Torque: Bias=400·N·m
Left Turn: Clutch_Torque_Left=341·N·m
Right Turn: Clutch_Torque_Right=284·N·m With continued reference to FIG. 1 and additional reference to FIG. 2, a method of determining clutch torque for a limited slip differential mechanism 34 on a vehicle 90 according to one example of the present disclosure will be described. The $T_{Driveline}$ is an estimated driveline torque value or a target driveline torque desired for use in a particular vehicle 90. A requested bias torque is also established consistent for the particular vehicle 90. In some examples, the estimated driveline torque and requested bias torque are provided from a customer having a subset of differential output requirements for a particular vehicle 90. As is known, a bias torque is a difference between a left shaft torque 92 and a right shaft torque 94. By way of example, if a requested bias torque is 2000 Nm, the difference between the left and right shaft torques 92 and 94 needs to be 2000 Nm. However, as explained above, because of the additional gear bias torque provided by the bevel gear set 80, the actual required clutch torque from the clutch assembly 32 needed to achieve 2000 Nm may be less than 2000 Nm.

In some prior art examples there is an assumption that the commanded clutch torque will be equivalent to the requested bias torque. Using the example above, prior art assumptions are that commanding a clutch torque of 2000 Nm will result in a 2000 Nm bias torque. As explained in this disclosure however this is an inaccurate assumption due at least in part by the additional differential gear bias torque realized in the differential gear assembly 34. The equations above take into account this additional differential gear bias. As a result, a controller 100 can command a more accurate commanded clutch torque to the clutch assembly 32 to attain the desired bias torque.

It is also appreciated from the above equations that the direction in which the vehicle is turning (left or right) will factor into the commanded clutch torque. Using the 2000 Nm desired bias torque example above, if the vehicle 90 is turning left, the controller 100 may need to command 1500 Nm of clutch torque to achieve 2000 Nm of desired bias torque. However, if the vehicle 90 is turning right, the controller 100 may need to command less than the 1500 Nm of clutch torque to achieve the same 2000 Nm of desired bias torque. This is due to the gear bias being greater while turning right with a clutch assembly 32 disposed on the left (left of the bevel gear set 80 as viewed in FIG. 1). Again it is appreciated that these torque values are merely exemplary and other values may be used. Driveline torque also contributes to the needed commanded clutch torque. In this regard, if more driveline torque is being input into the differential assembly 34, less clutch torque is required to be commanded to achieve the target bias torque. The commanded clutch torque therefore is reduced as the driveline torque is increased.

Additionally it will be appreciated that the equations will be altered based on a location of the clutch assembly 32. Explained further, a clutch assembly 32 disposed between the bevel gear set 80 and the right axle shaft 42 would have different equations than set forth above using the example shown in FIG. 1 with the clutch assembly 32 disposed between the bevel gear set 80 and the left axle shaft 42. Moreover, some differential gear assemblies 34 having other clutch assembly configurations (clutches on opposite sides of the bevel gear set 80 for example) would result in different differential gear bias torque and require different equations.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method of providing a requested output shaft torque, including a left output shaft torque and a right output shaft torque, with a limited slip differential gear mechanism having a clutch assembly, the limited slip differential gear mechanism disposed on a vehicle, the method comprising:
   receiving a request for a desired bias torque delivered by the left and right output shafts;
   receiving an estimated driveline torque;
   one of:
      determining whether the vehicle is turning left and establishing a first differential gear bias torque based on the vehicle turning left; and
      determining whether the vehicle is turning right and establishing a second differential gear bias torque based on the vehicle turning right;
   determining a clutch torque necessary to be delivered by the clutch assembly to attain the desired bias torque based on the determined first or second differential gear bias torque; and
   commanding the clutch torque with the limited slip differential necessary to achieve the desired bias torque.

2. The method of claim 1, wherein estimating the dutch torque necessary comprises:
   calculating the dutch torque using a first set of equations based on the vehicle turning left.

3. The method of claim 1, wherein estimating the clutch torque necessary comprises:
   calculating the clutch torque using a second set of equations based on the vehicle turning right.

4. The method of claim 1 wherein the commanding the clutch torque is reduced as the driveline torque is increased.

5. The method of claim 1 wherein the limited slip differential gear mechanism includes a bevel gear set comprising pinion gears and side gears, wherein the bevel gear set generates the first differential gear bias torque or the second differential gear bias torque and wherein estimating the dutch torque is based on the differential gear bias torque.

\* \* \* \* \*